(12) United States Patent
Uchida et al.

(10) Patent No.: US 7,677,456 B2
(45) Date of Patent: Mar. 16, 2010

(54) INFORMATION READER, OBJECT, INFORMATION PROCESSING APPARATUS, INFORMATION COMMUNICATING SYSTEM, INFORMATION READING METHOD, AND PROGRAM

(75) Inventors: Norio Uchida, Tokyo (JP); Takeaki Minamizawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/432,077

(22) Filed: May 10, 2006

(65) Prior Publication Data

US 2007/0007349 A1    Jan. 11, 2007

(30) Foreign Application Priority Data

May 10, 2005    (JP)    ............... 2005-137328

(51) Int. Cl.
*G06K 7/10* (2006.01)
(52) U.S. Cl. .................. 235/454; 235/462.25
(58) Field of Classification Search ................. 235/487, 235/454, 462.01–462.45, 472.01, 472.02, 235/472.03
See application file for complete search history.

(56) References Cited

U.S. PATENT DOCUMENTS 6,267,296 B1 *    7/2001    Ooshima et al. ............ 235/487

| | | | |
|---|---|---|---|
| 7,216,810 B2 * | 5/2007 | Zhu et al. ............ 235/462.22 |
| 2002/0020747 A1 * | 2/2002 | Wakamiya et al. ..... 235/462.11 |
| 2002/0044689 A1 * | 4/2002 | Roustaei et al. ............. 382/199 |
| 2006/0050961 A1 * | 3/2006 | Thiyagarajah ............... 382/181 |

FOREIGN PATENT DOCUMENTS

| CN | 1898676 A | 1/2004 |
|---|---|---|
| CN | 1898676 A | 1/2007 |
| JP | 2000-261751 | 9/2000 |
| JP | 2001-127990 | 5/2001 |
| JP | 2003-187185 | 7/2003 |

* cited by examiner

*Primary Examiner*—Thien M Le
(74) *Attorney, Agent, or Firm*—Scully, Scott, Murphy & Presser, P.C.

(57) ABSTRACT

An information reader includes an object reading unit for reading an image of an object and obtaining the image as image data, an object data obtaining unit for analyzing the image data and obtaining object data as data contained in the object itself, a state data obtaining unit for obtaining state data indicating a state of the object during object image reading operation to read an image of the object, and an identifying unit for identifying predetermined processing by using as identification data the object data and at least one of the state data. The information which is obtained when an object is shot and which is meaningless in the conventional techniques can be effectively used. Therefore, the quantity of overall information can be increased without adding new hardware to the information reader.

45 Claims, 12 Drawing Sheets

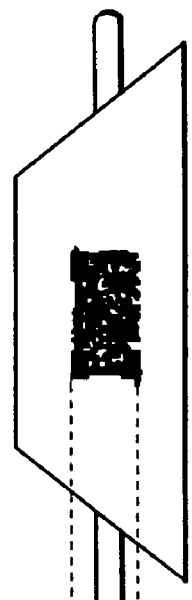
FIG. 3A
45° ROTATION
THIS EDGE SEEMS TO HAVE A LENGTH OF $1/\sqrt{2}$
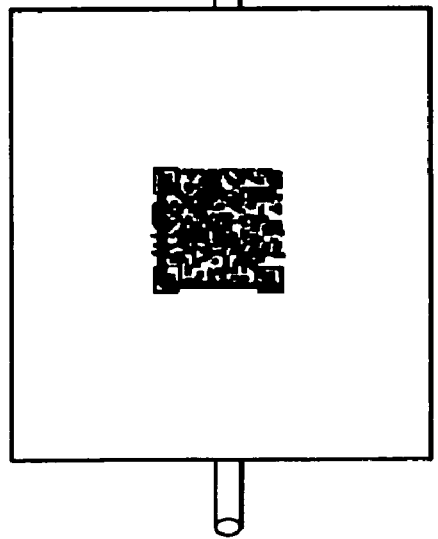
FIG. 3B

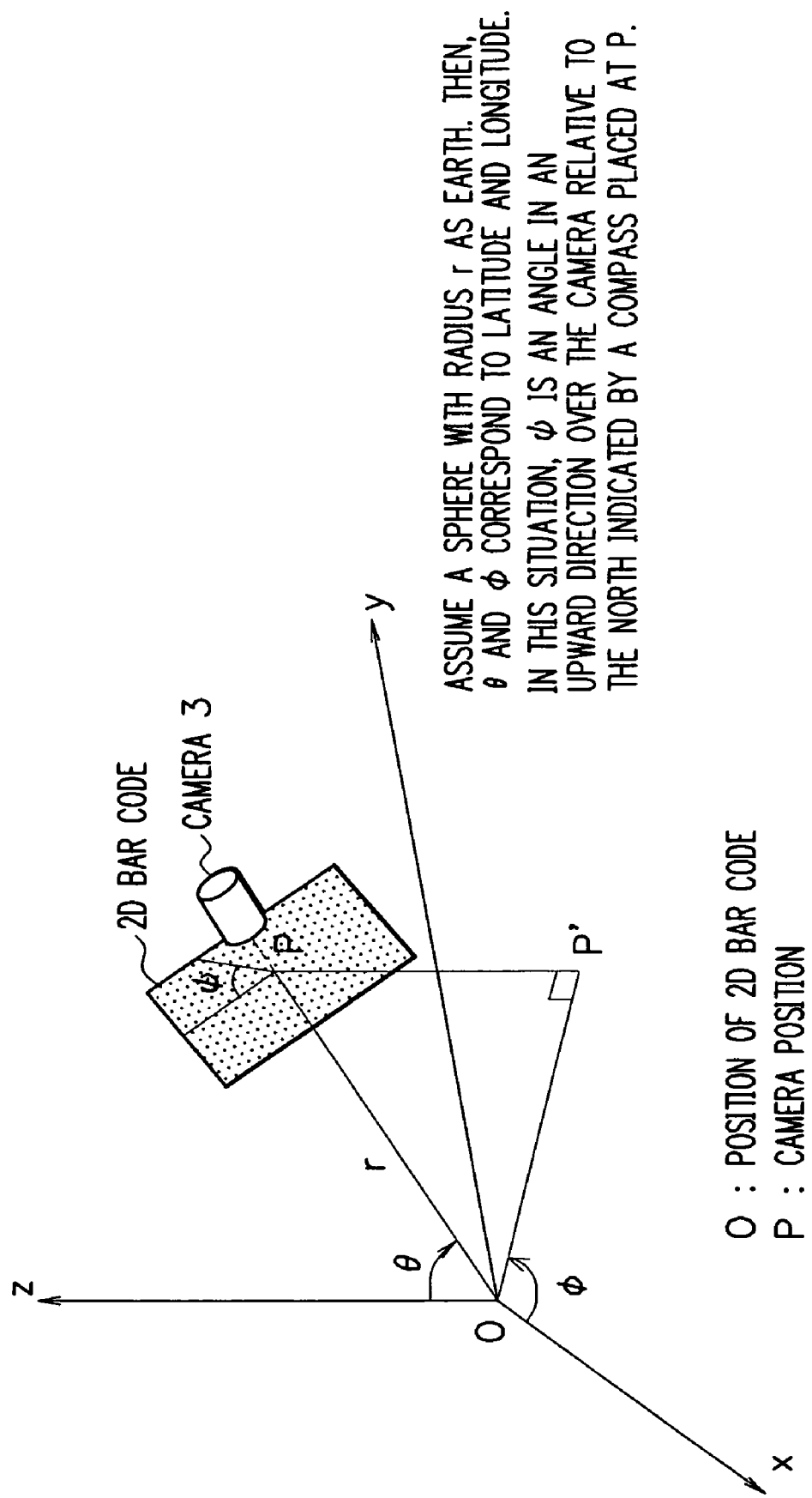

F I G. 10
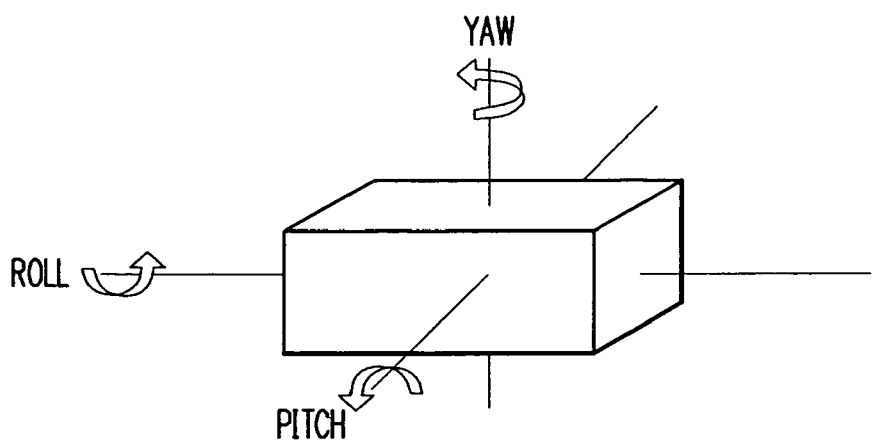
• ASSUME THAT PARALLELEPIPED IS SHIP MOVING LEFT. THEN, ROLL, PITCH, AND YAW (CONTROLLED BY RUDDER) ARE DEFINED AS ABOVE.

F I G. 11

(a)

| SHOOTING DIRECTION DATA θ | INDEX VALUE |
|---|---|
| −90°~−54° | 00 |
| −53°~−19° | 01 |
| −18°~+18° | 02 |
| +19°~+53° | 03 |
| +54°~+90° | 04 |

+

(b)

| SHOOTING DIRECTION DATA φ | INDEX VALUE |
|---|---|
| −90°~−54° | 00 |
| −53°~−19° | 01 |
| −18°~+18° | 02 |
| +19°~+53° | 03 |
| +54°~+90° | 04 |

INDEX VALUE =0304

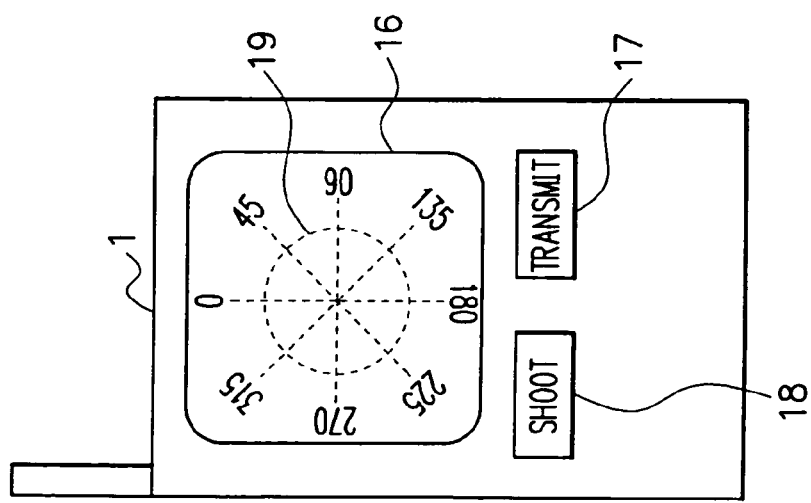
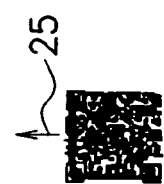
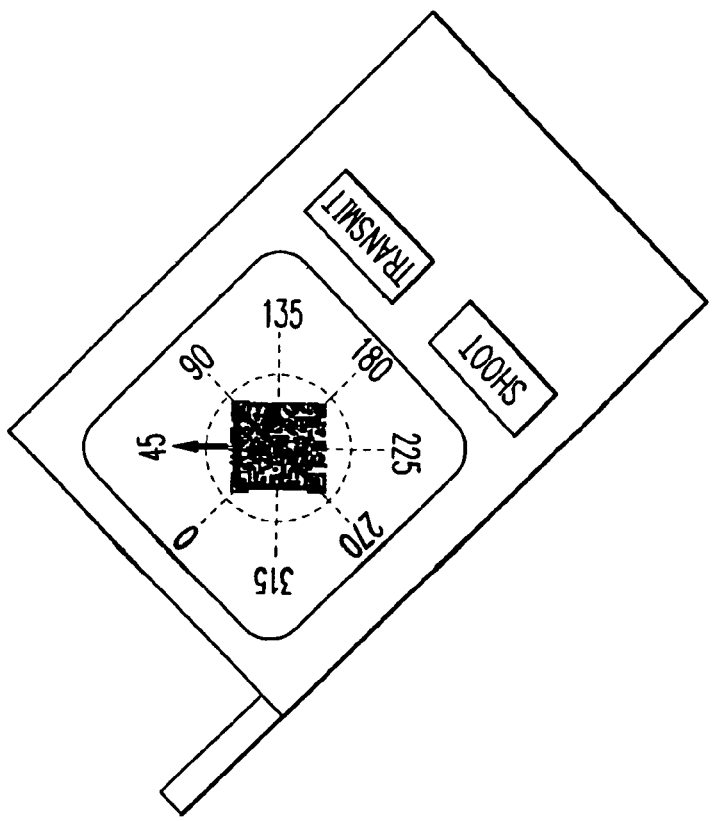

FIG. 13

| INDEX VALUE FOR EACH READING OPERATION ||| DISPLAY DATA | ACTION (PROCESSING) |
|---|---|---|---|---|
| 1ST | 2ND | 3RD | | |
| 0100 | 0002 | 0404 | IMAGE INDICATING SUCCESSFUL AUTHENTICATION | OPEN KEY |
| OTHER THAN 0100 | OTHER THAN 0002 | OTHER THAN 0404 | IMAGE INDICATING FAILED AUTHENTICATION | NONE |

FIG. 14A http://www.sample.co.jp/pict? dir=✶✶✶%✶✶✶& range=✶✶✶

(EMPTY FIELD, EMPTY FIELD, EMPTY FIELD)

FIG. 14B http://www.sample.co.jp/pict? dir=✶✶✶%✶✶✶& range=✶✶✶ &rot=✶✶✶%✶✶✶%✶✶✶&size=030

(PRINT SIZE)

FIG. 14C http://www.sample.co.jp/pict? dir=045%090& range=120&rot=060%030%045&size=030

(CALCULATED VALUE)

INFORMATION READER, OBJECT, INFORMATION PROCESSING APPARATUS, INFORMATION COMMUNICATING SYSTEM, INFORMATION READING METHOD, AND PROGRAM

BACKGROUND OF THE INVENTION

1. Field of the Invention

The present invention relates to an information reader, an object, an information processing apparatus, an information communicating system, an information reading method, and a program in which an image of an object is read to acquire information embedded in the image.

2. Description of the Prior Art

Recently, there has been widely used an information reader which reads an image of an object such as a bar code using a small-sized camera or scanner to thereby attain information buried in the image. Representative examples of such information readers are a bar code reader for merchandise management and a cellular phone including a camera capable of reading a two-dimensional bar code (2D code). In addition, a radio-frequency (RF) tag and an information reading apparatus to read information from an RF have increasingly come into wide spread. To read an object by such an information reader, even if a position or an angle of the reader with respect to the object, for example, a tag or a bar code, is varied, information attained from an image of the object is ordinarily kept unchanged so long as the position or the angle is within a range enabling the reader to obtain an image of the object.

For example, Japanese Patent Application Laid-Open No. 2000-261751 entitled "Image Authentication System and Method" describes an information reader of the conventional art. The conventional technique includes an identifier related to an object, a receiver to inspect the identifier to resultantly generate identifier information, a camera to record an image of the identifier, and a composite generator that encodes the identifier information sent from the receiver to create composite data according to the image obtained by the camera.

On the other hand, Japanese Patent Application Laid-Open No. 2001-127990 entitled "Information Communication System" describes another example of the information reader of the conventional art. In the communication system, a camera shoots an image of an object including a person. Before transmitting the image in a real-time operation via a predetermined communication path (network) to a desired transmission destination, an image recognizer decomposes the person and a background of the image into mutually different objects. Thereafter, a converted image selector converts the respective objects into mutually different images to transfer the obtained images to the communicating party.

However, the conventional information readers are attended with a problem that the information acquired from the object is kept unchanged in any situation and it is not possible to change the information through a simple operation in the image reading process. This is because the information indicating a reading state of the information reader relative to the object, e.g., a positional relationship or an angle therebetween is used only for correction. That is, the information is not employed as significant or meaningful information in the information reading operation. Further, any person can read the information using the information reader. If it is desired to restrict acquisition of the information in the object, there arises a problem that an authentication procedure is additionally required.

SUMMARY OF THE INVENTION

It is therefore an object of the present invention, which has been devised to solve the problems, to provide an information reader to read information from an image of an object using, for example, a camera or a scanner. In the information reader, meaning of the information is changed according to a relative positional relationship between the object and the reader, a rotary angle of the reader, or a peripheral or environmental state.

To achieve the object in accordance with a first aspect of the present invention, there is provided an information reader including an object reading unit for reading an image of an object and obtaining the image as image data, an object data obtaining unit for analyzing the image data and obtaining object data as data contained in the object itself, a state data obtaining unit for obtaining state data indicating a state of the object during object image reading operation to read an image of the object, and an identifying unit for identifying predetermined processing by using as identification data at least one of the state data and the object data.

In accordance with a second aspect of the present invention, the information reader further includes a storage unit for storing therein at least one of the state data and the object data and the predetermined processing with a corresponding established therebetween. The identifying unit identifies the predetermined processing by referring to the storage unit.

In accordance with a third aspect of the present invention, the information reader further includes a connecting unit for connecting to an external storing medium storing therein at least one of the state data and the object data and the predetermined processing with a corresponding established therebetween. The identifying unit identifies the predetermined processing by referring to the external storing medium.

In accordance with a fourth aspect of the present invention, the information reader further includes a communicating unit for conducting communication with an external information processing apparatus. The reader transmits at least one of the state data and the object data via the communicating unit to the information processing apparatus.

In accordance with a fifth aspect of the present invention, in the information reader, the identifying unit identifies predetermined data by using as identification data at least one of the state data and the object data.

In accordance with a sixth aspect of the present invention, in the information reader, the identifying unit creates new data according to at least one of the state data and the object data.

In accordance with a seventh aspect of the present invention, the information reader further includes a data output unit for outputting therefrom data identified by the identifying unit, new data created by the identifying unit, and data received from the information processing apparatus.

In accordance with an eighth aspect of the present invention, the information reader further includes a temporary storage unit for temporarily saving, when a plurality of state data items are obtained by the state data obtaining unit, the plural state data items therein. The identifying unit uses as identification data the plural state data items saved in the temporary storage unit.

In accordance with a ninth aspect of the present invention, the information reader further includes a state data confirming unit for enabling a user of the information reader to confirm a value of state data obtained during the object image reading operation.

In accordance with a tenth aspect of the present invention, the information reader further includes a state data changing unit for enabling a user of the information reader to arbitrarily change a value of state data obtained during the object image reading operation.

In accordance with an 11th aspect of the present invention, in the information reader, the state data obtaining unit acquires as the state data at least either one of data indicating a state of the information reader during the object image reading operation and data indicating a state around the object during the object image reading operation.

In accordance with a 12th aspect of the present invention, in the information reader, the state data is direction data indicating a reading direction of the information reader with respect to the object.

In accordance with a 13th aspect of the present invention, in the information reader, the state data is one selected from distance data indicating distance between the object and the information reader, inclination data indicating inclination of the information reader itself during the object image reading operation, color temperature data indicating color temperature of the object during the object image reading operation, peripheral temperature data indicating peripheral temperature of the object during the object image reading operation, and peripheral light quantity data indicating a quantity of peripheral light of the object during the object image reading operation.

In accordance with a 14th aspect of the present invention, in the information reader, the image of the object is a two-dimensional code.

In accordance with a 15th aspect of the present invention, there is provided an object including predetermined object data embedded therein, the object data being read by an information reader, and state data designating information to designate required state data in state data which is obtained by the information reader and which indicates a state during reading operation of the information reader.

In accordance with a 16th aspect of the present invention, the object further includes a guide mark for a user of the information reader to confirm a reading state during the reading operation of the information reader.

In accordance with a 17th aspect of the present invention, the object further includes an angle changing unit for changing an angle of a plane read by the information reader.

In accordance with an 18th aspect of the present invention, there is provided an object including predetermined object data embedded therein, the object data being read by an information reader, a guide mark for a user of the information reader to confirm a reading state during the reading operation of the information reader, and an angle changing unit for changing an angle of a plane read by the information reader.

In accordance with a 19th aspect of the present invention, there is provided an information processing apparatus for communicating with an information reader for reading an image of an object and obtaining object data as data contained in the object itself. The apparatus includes an identifying unit for receiving state data which is obtained by the information reader and which indicates a state of the information reader during object image reading operation to read the object by the information reader, and identifying predetermined processing by using at least one of state data and the object data as identification data.

In accordance with a 20th aspect of the present invention, the information processing apparatus further includes a storage unit for storing therein at least one of the state data and the object data and the predetermined processing with a corresponding established therebetween. The identifying unit identifies the predetermined processing by referring to the storage unit.

In accordance with a 21st aspect of the present invention, in the information processing apparatus, the identifying unit identifies predetermined data by using as identification data at least one of the state data and the object data.

In accordance with a 22nd aspect of the present invention, in the information processing apparatus, the identifying unit creates new data according to at least one of the state data and the object data.

In accordance with a 23rd aspect of the present invention, the information processing apparatus further includes a temporary storage unit for temporarily saving, when a plurality of state data items are received from the information reader, the plural state data items therein. The identifying unit uses as identification data the plural state data items saved in the temporary storage unit.

In accordance with a 24th aspect of the present invention, in the information processing apparatus, the state data is at least either one of data indicating a state of the information reader during the object image reading operation and data indicating a state around the object during the object image reading operation.

In accordance with a 25th aspect of the present invention, in the information processing apparatus, the state data is direction data indicating a reading direction of the information reader with respect to the object.

In accordance with a 26th aspect of the present invention, in the information processing apparatus, the state data is one selected from distance data indicating distance between the object and the information reader, inclination data indicating inclination of the information reader itself during the object image reading operation, color temperature data indicating color temperature of the object during the object image reading operation, peripheral temperature data indicating peripheral temperature of the object during the object image reading operation, and peripheral light quantity data indicating a quantity of peripheral light of the object during the object image reading operation.

In accordance with a 27th aspect of the present invention, in the information processing apparatus, the image of the object is a two-dimensional code.

In accordance with a 28th aspect of the present invention, there is provided an information communicating system including an information reader for reading an image of an object and obtaining object data as data contained in the object itself, and an information processing apparatus for communicating with the information reader. The information communicating system uses, as identification data, at least one of state data which is obtained by the information reader and which indicates a state of the information reader during object image reading operation to read the object by the information reader and the object data.

In accordance with a 29th aspect of the present invention, there is provided an information communicating system including an information reader and an information processing apparatus for communicating with the information reader. The information reader includes an object reading unit for reading an image of an object and obtaining the image as image data, an object data obtaining unit for analyzing the image data and obtaining object data as data contained in the object itself, a state data obtaining unit for obtaining state data indicating a state of the object during object image reading operation to read an image of the object, and a first communicating unit for transmitting at least one of the state data and the object data to the information processing apparatus. The information processing apparatus includes a second communicating unit for receiving the object data and the state data from the information reader and an identifying unit for identifying predetermined processing by using as identification data at least one of the state data and the object data.

In accordance with a 30th aspect of the present invention, in the information communicating system, the information processing apparatus further includes a storage unit for storing therein at least one of the state data and the object data and the predetermined processing with a corresponding established therebetween. The identifying unit identifies the predetermined processing by referring to the storage unit.

In accordance with a 31st aspect of the present invention, in the information communicating system, the information processing apparatus identifying by the identifying unit predetermined data by using as identification data at least one of the state data and the object data.

In accordance with a 32nd aspect of the present invention, in the information communicating system, the information processing apparatus creates by the identifying unit new data according to at least one of the state data and the object data.

In accordance with a 33rd aspect of the present invention, in the information communicating system, the information processing apparatus further includes a first temporary storage unit for temporarily saving, when a plurality of state data items are received from the information reader, the plural state data items therein. The identifying unit uses as identification data the plural state data items saved in the first temporary storage unit.

In accordance with a 34th aspect of the present invention, in the information communicating system, the information reader further includes a transmission data generating unit for combining the object data with the state data and thereby generating data to be transmitted to the information processing apparatus.

In accordance with a 35th aspect of the present invention, in the information communicating system, the information reader further includes a data output unit for outputting data received from the information processing apparatus.

In accordance with a 36th aspect of the present invention, in the information communicating system, the information reader further includes a second temporary storage unit for temporarily saving, when a plurality of state data items are received from the data obtaining unit, the plural state data items therein.

In accordance with a 37th aspect of the present invention, in the information communicating system, the information reader acquires by the state data obtaining unit as the state data at least either one of data indicating a state of the information reader during object image reading operation to read the object image and data indicating a state around the object during the object image reading operation.

In accordance with a 38th aspect of the present invention, in the information communicating system, the state data is direction data indicating a reading direction of the information reader with respect to the object.

In accordance with a 39th aspect of the present invention, in the information communicating system, the state data is one selected from distance data indicating distance between the object and the information reader, inclination data indicating inclination of the information reader itself during the object image reading operation, color temperature data indicating color temperature of the object during the object image reading operation, peripheral temperature data indicating peripheral temperature of the object during the object image reading operation, and peripheral light quantity data indicating a quantity of peripheral light of the object during the object image reading operation.

In accordance with a 40th aspect of the present invention, in the information communicating system, the image of the object is a two-dimensional code.

In accordance with a 41st aspect of the present invention, in the information communicating system, the object further includes state data designating information to designate required state data in the state data.

In accordance with a 42nd aspect of the present invention, there is provided an information reading method for use with an information reader. The method includes the steps of reading an image of an object and obtaining the image as image data, obtaining state data indicating a state of the object during object image reading operation to read an image of the object, analyzing the image data and obtaining object data as data contained in the object itself, and identifying predetermined processing by using as identification data at least one of the state data in the state data and the object data.

In accordance with a 43rd aspect of the present invention, there is provided an information reading method for use with an information reader and an information processing apparatus communicating with the information reader. The method includes the steps by the information reader of reading an image of an object and obtaining the image as image data, obtaining state data indicating a state of the object during object image reading operation to read an image of the object, analyzing the image data and obtaining object data as data contained in the object itself, and transmitting at least one of the state data and the object data to the information processing apparatus. The method further includes the steps by the information processing apparatus of receiving the object data and the state data from the information reader, and identifying predetermined processing by using as identification data at least one of the state data and the object data.

In accordance with a 44th aspect of the present invention, the information reading method further includes the step by either one of the information reader and the information processing apparatus of identifying predetermined data by using as identification data at least one of the state data in the state data.

In accordance with a 45th aspect of the present invention, the information reading method further includes the step by either one of the information reader and the information processing apparatus of creating new data according to at least one of the state data in the state data and the object data.

In accordance with a 46th aspect of the present invention, the information reading method further includes the step by either one of the information reader and the information processing apparatus of outputting the identified data and the new created data.

In accordance with a 47th aspect of the present invention, the information reading method further includes the step in either one of the information reader and the information processing apparatus of temporarily saving, when a plurality of state data items are obtained by the state data obtaining step, the plural state data items.

In accordance with a 48th aspect of the present invention, the information reading method further includes in the information reader the step of enabling a user of the information reader to confirm a value of state data obtained during the object image reading operation.

In accordance with a 49th aspect of the present invention, the information reading method further includes in the information reader the step of changing a value of state data obtained during the object image reading operation.

In accordance with a 50th aspect of the present invention, in the information reading method, the state data obtaining step includes the step of obtaining as the state data at least either one of data indicating a state of the information reader during the object image reading operation and data indicating a state around the object during the object image reading operation.

In accordance with a 51st aspect of the present invention, in the information reading method, the state data is direction data indicating a reading direction of the information reader with respect to the object.

In accordance with a 52nd aspect of the present invention, in the information reading method, the state data being one selected from distance data indicating distance between the object and the information reader, inclination data indicating inclination of the information reader itself during the object image reading operation, color temperature data indicating color temperature of the object during the object image reading operation, peripheral temperature data indicating peripheral temperature of the object during the object image reading operation, and peripheral light quantity data indicating a quantity of peripheral light of the object during the object image reading operation.

In accordance with a 53rd aspect of the present invention, in the information reading method, the image of the object is a two-dimensional code.

In accordance with a 54th aspect of the present invention, there is provided a program for making an information reader execute an object reading step of reading an image of an object and obtaining the image as image data, an object data obtaining step of analyzing the image data and obtaining object data as data contained in the object itself, a state data obtaining step of obtaining state data indicating a state of the object during object image reading operation to read an image of the object, and an processing identifying step of identifying predetermined processing by using as identification data at least one of the state data and the object data.

In accordance with a 55th aspect of the present invention, the program further makes an information reader execute a data identifying step of identifying predetermined data by using as identification data at least one of the state data and the object data.

In accordance with a 56th aspect of the present invention, the program further makes an information reader execute a data creating step of creating new data according to at least one of the state data and the object data.

In accordance with a 57th aspect of the present invention, the program further makes an information reader execute a transmitting step of transmitting at least one of the state data and the object data to an external information processing apparatus.

In accordance with a 58th aspect of the present invention, the program further makes an information reader execute a data output step of outputting therefrom the identified data, the new created data, and data received from the information processing apparatus.

In accordance with a 59th aspect of the present invention, the program further makes an information reader execute a temporary saving step of temporarily saving, when a plurality of state data items are obtained in the state data obtaining step, the plural state data items.

In accordance with a 60th aspect of the present invention, the program further makes an information reader execute a state data confirming step of enabling a user of the information reader to confirm a value of state data obtained during the object image reading operation.

In accordance with a 61st aspect of the present invention, the program further makes an information reader execute a state data changing step of changing a value of state data obtained during the object image reading operation.

In accordance with a 62nd aspect of the present invention, the program further makes an information reader acquire, in the state data obtaining step, as the state data at least either one of data indicating a state of the information reader during the object image reading operation and data indicating a state around the object during the object image reading operation.

In accordance with a 63rd aspect of the present invention, there is provided a program for making an information processing apparatus execute a receiving step of receiving object data which is obtained by an information reader for reading an image of an object and which is contained in the object itself and state data indicating a state of the object during the object image reading operation, and a processing identifying step of identifying predetermined processing by using as identification data at least one of the state data and the object data.

In accordance with a 64th aspect of the present invention, the program further makes an information processing apparatus execute a data identifying step of identifying predetermined data by using as identification data at least one of the state data and the object data.

In accordance with a 65th aspect of the present invention, the program further makes an information processing apparatus execute a data creating step of creating new data according to at least one of the state data and the object data.

In accordance with a 66th aspect of the present invention, the program further makes an information processing apparatus execute a temporary saving step of temporarily saving, when a plurality of state data items are obtained by the receiving step, the plural state data items.

In accordance with the present invention, information which is attained in an operation to read an image of an object and which is meaningless in the conventional art can be effectively used as meaningful information. Therefore, the amount of information items to be handled can be increased without installing additional hardware in the information reader.

BRIEF DESCRIPTION OF THE DRAWINGS

The objects and features of the present invention will become more apparent from the consideration of the following detailed description taken in conjunction with the accompanying drawings in which:

FIG. 3A is a diagram schematically showing a shooting state of a 2D bar code shot by a camera according to the first embodiment;

FIG. 3B is a diagram schematically showing a shooting state of a 2D bar code shot by a camera according to the first embodiment;

FIG. 4 is a graphic diagram schematically showing a positional relationship between a 2D bar code reader and a camera according to the first embodiment;

FIG. 10 is a schematic diagram showing a definition of inclination data according to the fourth embodiment;

FIG. 11 is a diagram schematically showing tables to extract an index value according to the fourth embodiment;

FIG. 12A is a diagram schematically showing a portable terminal according to a fifth embodiment of the present invention;

FIG. 12B is a diagram schematically showing guide marks of a 2D bar code in the fifth embodiment;

FIG. 12C is a diagram schematically showing the portable terminal and the guide marks of a 2D bar code in the fifth embodiment;

FIG. 13 is a diagram showing a table to open a dial lock key in the fifth embodiment;

FIG. 14A is a diagram showing an example of an optional parameter in a seventh embodiment of the present invention;

FIG. 14B is a diagram showing an example of an optional parameter in the seventh embodiment;

FIG. 14C is a diagram showing an example of an optional parameter in the seventh embodiment;

DESCRIPTION OF THE EMBODIMENTS

Referring next to the accompanying drawings, description will be given in detail of embodiments in accordance with the present invention.

First, an outline of the present invention will be described by referring to FIG. 15.

Figure 15:
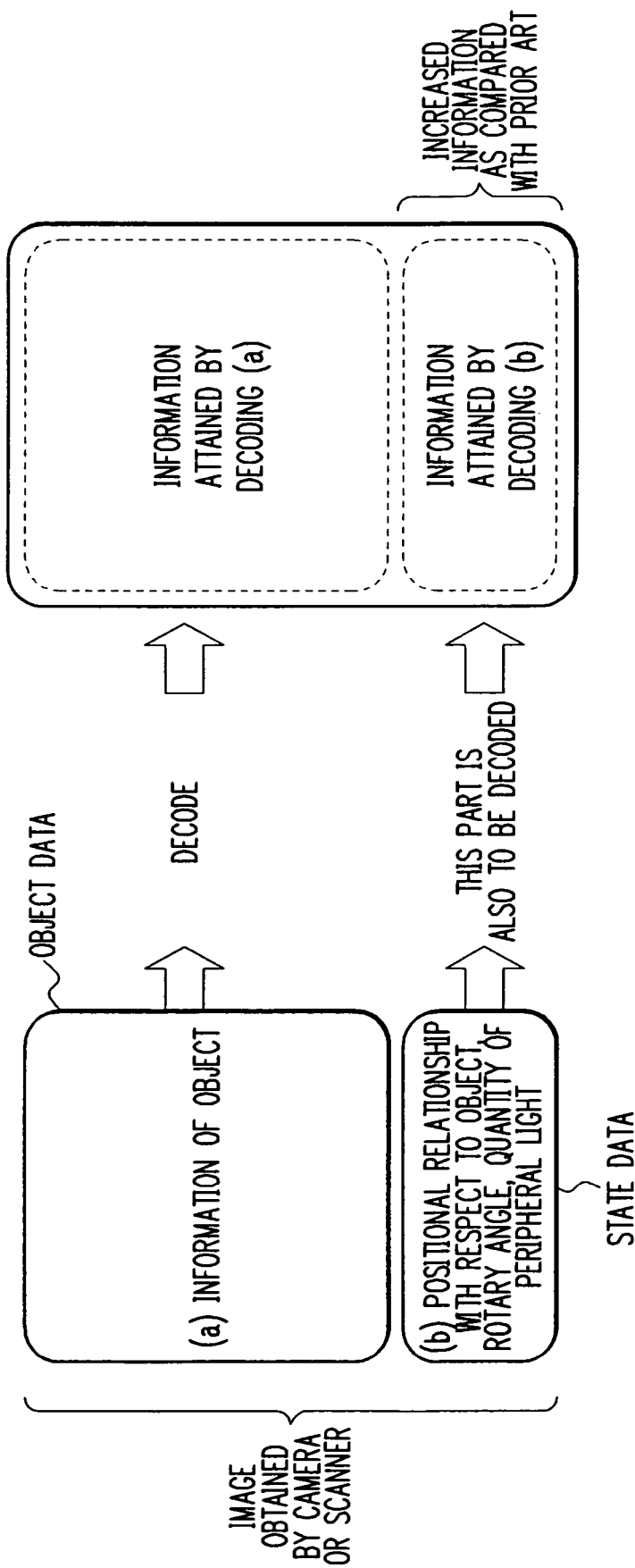
FIG. 15 is a diagram schematically showing a layout of information obtained by an information reader in accordance with the present invention.

The information obtained by reading an image of an object by, for example, a camera or a scanner includes (a) information of the object itself (to be referred to as object data hereinbelow) and (b) information indicating a state during the object image reading operation (to be referred to as state data hereinbelow) such as a relative positional relationship between the object and the information reader, a rotary angle (inclination) of the information reader, and a peripheral state or an environmental state, for example, a quantity of light or temperature as shown in FIG. 15. The conventional information reader decodes or analyzes only the information of item (a) above to hence obtain only object data. The data of item (b) is not decoded. That is, the state data is adopted only as correction information for the decoding operation. The information reading apparatus in accordance with the present invention also decodes the state data of item (b) to attain new information. As a result, the state data conventionally not having particular meaning at all in the conventional art can be effectively used as meaningful information. When compared with the conventional technique, the technique in accordance with the present invention increases the amount of information items to be treated without installing additional hardware to the information reader. In addition, by changing the additional amount of information through a simple operation during the information reading process, the information to be handled can be further increased in quantity.

First Embodiment

Referring now to the drawings, description will be given in detail of a first embodiment of the present invention.

Figure 1:
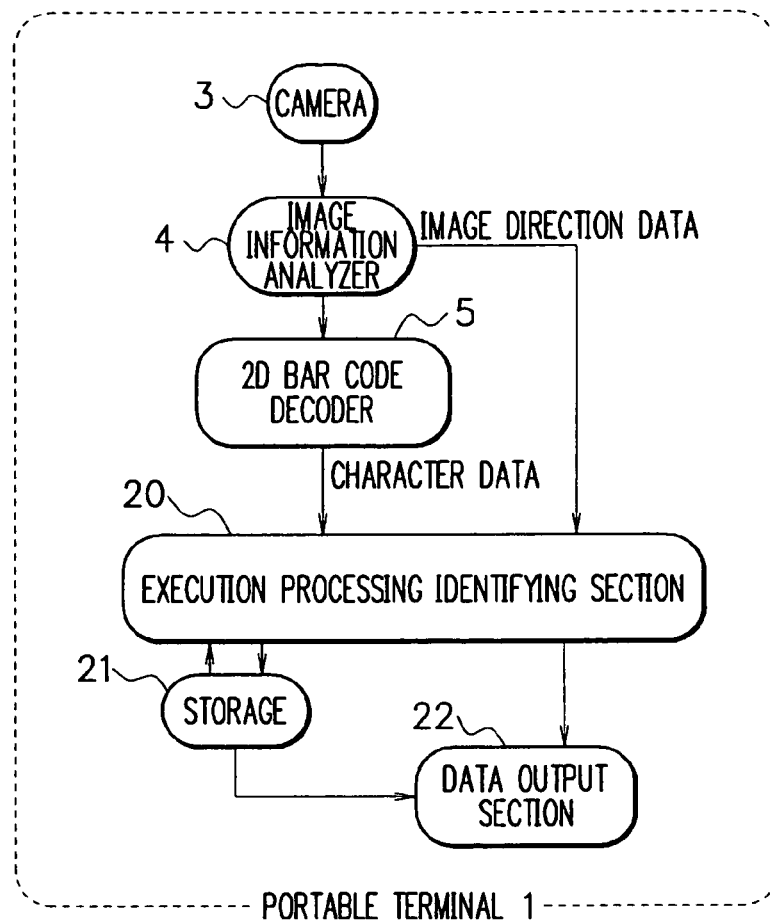
FIG. 1 is a schematic block diagram showing a configuration of a cellular phone of a first embodiment in accordance with the present invention.

Description will be given of a portable terminal as an information reader in accordance with a first embodiment of the present invention. FIG. 1 shows a configuration of the portable terminal according to the embodiment.

The portable terminal 1 is an information reading device having a function to read an object onto which an image with predetermined information embedded therein is printed to obtain the image. The terminal 1 resultantly acquires the information from the obtained image. The terminal 1 is, for example, a cellular phone, a personal digital assistant, or a bar code reader. As can be seen from FIG. 1, the portable terminal 1 includes a camera 3, an image information analyzer 4, a two-dimensional bar code decoder section 5, an execution processing identifying section 20, a storage section 21, and a data output section 22. Although this embodiment includes a portable terminal as an example of the information reader, the present invention is not restricted by this example.

The camera 3 has a function to shoot a 2D bar code, an image of the object, to attain the image in the form of image data. The camera 3 then sends the image data to the image information analyzer 4.

Figure 16A:
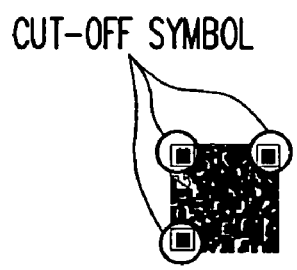
FIG. 16A is an example of appearance of a 2D bar code in accordance with the present invention.
Figure 16B:
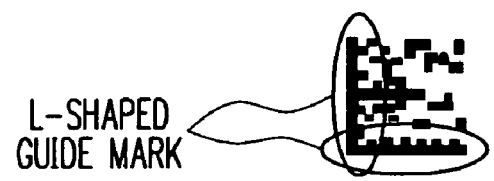
FIG. 16B is an example of appearance of a 2D bar code in accordance with the present invention.

Description will next be given of the 2D bar code to be shot by the camera 3. The bar code as an object in the first embodiment is an image of a two-dimensional graphic pattern of, for example, characters and numerals. The image is embossed or printed on a reading object, for example, a surface of a body or substance or a surface of a sheet of paper. In the 2D bar code, predetermined information items are buried in the horizontal and vertical directions. There exist two kinds of 2D bar codes, i.e., "stack 2D code" in which conventional one-dimensional bar codes are cumulated and "matrix 2D code" in which patterns are arranged in a lattice pattern. The matrix 2D bar codes include, for example, a Quick Response (QR) code shown in FIG. 16A and a CP code shown in FIG. 16B. Due to cut-off symbols at three positions in the Quick Response (QR) code and an L-shaped guide mark on the CP code, the embedded information can be read to be detected at a high speed. The information obtained from the cut-off symbols and the L-shaped guide mark is the state data (FIG. 15B) and is employed only for correction in the decoding operation in the ordinary situation. That is, the information is not decoded and has not any significant meaning in the conventional art.

According to the first embodiment, the state data attained from the cut-off symbols or the L-shaped guide mark is also decoded to be effectively used as meaningful information. In this connection, a shooting state obtained by shooting the cut-off symbols or the L-shaped guide mark (e.g., a positional relationship on a plane of the image resultant from the shooting) is one kind of state data (FIG. 15B). Ordinarily, the shooting state is employed to correct an image to decode the object data, but does not affect the contents of processing to be executed thereafter. In the first embodiment, the shooting state is obtained to be recorded as state data and is effectively employed as a parameter that determines the contents of subsequent processing.

In the description of the embodiment, a QR code of a matrix 2D bar code is employed as an example. However, it is also possible to use any bar code other than the 2D bar code, for example, a one-dimensional bar code.

The image information analyzing module 4 has a function to analyze image data of the 2D bar code sent from the camera 3, and determine and record a direction in which the bar code is shot to thereby obtain shooting direction data (an example of state data). The analyzer 4 also has a function to send the data to the execution processing identifying section 20 and the image data to the 2D bar code decoder 5.

The decoder 5 has a function to analyze the image data of the 2D bar code sent from the analyzer 4 to produce character data, which is data (data of the object) of the 2D bar code, and a function to send the character data to the execution processing identifying section 20.

This section 20 includes a function to control operations in which processing to be executed is identified according to the character data from the decoder 5 and the shooting direction data from the analyzer 4 to resultantly execute the processing. The execution processing is identified by referring to a table beforehand stored in the storage section 21. The table includes predetermined execution processing corresponding to the character data and the shooting direction data. The identifying section 20 adopts the character data and the shooting direction data as identification data to determine execution processing. In the embodiment, both of the character data item and the shooting direction data item are employed to identify execution processing. However, only either one thereof may be used as the identification data.

The data output section 22 has a function to create data for the processing identified by the execution processing identifying section 20. The section 22 is, for example, a display section to display an image, a sounding section such as a speaker to produce sound and tone, a vibrating section to implement a function of a vibrator, or a signal transmitter section (an infrared ray emitter section) to send a predetermined signal to an external device.

Figure 2:
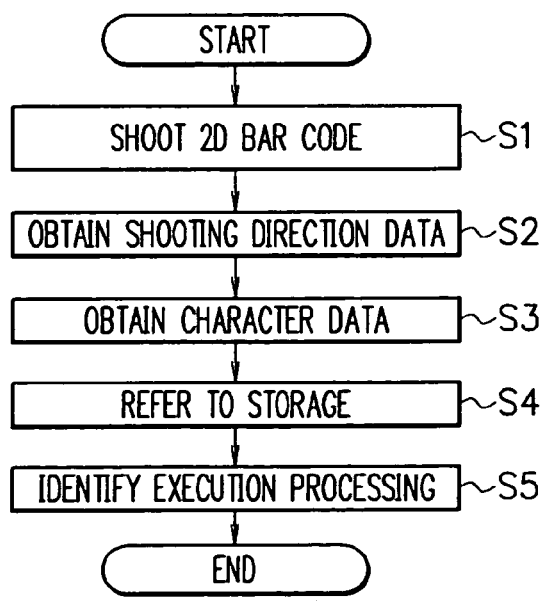
FIG. 2 is a flowchart showing operation of the portable terminal according to the first embodiment.

Referring next to FIG. 2, description will be given in detail of an operation of the portable terminal 1 in the embodiment (an information reading method and an information reading program). The portable terminal 1 conducts operations under control of the information reading program as below.

When a user of the terminal 1 shoots a 2D bar code by the camera 3, an image of the bar code is fed as image data to the image information analyzer 4 (step S1). The analyzer 4 then analyzes the image data and obtains a positional relationship between the bar code and the camera 3 (indicating a direction in which the camera 3 shoots the bar code). The analyzing module 4 sends the positional relationship as shooting direction data, for example, $\theta=45°$ and $\phi=90°$ ($\theta$ and $\phi$ are angles defined as shown in FIG. 4) to the execution processing identifying module 20 (step S2). The analyzer 4 also delivers the image data to the 2D bar code decoder 5.

Referring now to FIGS. 3A and 3B and FIG. 4, description will be given of the shooting direction attained by the analyzer 4. Assume that an image of the QR code shot, for example, from a position over a front surface of the QR (FIG. 3A) is compared with an image thereof shot from a side position as shown in FIG. 3B in which the QR code is rotated 45° relative to the state of FIG. 3A. Then, the length of an edge between an upper-left cut-off symbol and a lower-left cut-off symbol in FIG. 3B is $1/\sqrt{2}$ times the original length in principle. Three cut-off symbols are placed at the upper-left, lower-left, and upper-right positions in the QR code, and their sizes are equal. Therefore, by obtaining and analyzing the size and the position of each of the symbols from the image captured by the camera, the image information analyzer 4 can identify a position of the 2D bar code in a virtual space as shown in FIG. 4. This renders the analyzer 4 to detect the angle $\theta$ of FIG. 4. The other angles of FIG. 4 can also be determined in a similar fashion.

It is assumed that the x, y, and z axes of FIG. 4 are definable on the basis of a morphological feature of the object or the marking by colors. When the absolute size of the object is beforehand known, distance r from the object to the camera can be obtained even if the focal length of the camera is not known.

Thereafter, the 2D bar code decoder 5 acquires character data or object data from the image data received from the analyzer 4 (step S3). If the 2D bar code is a QR code, the three cut-off symbols are first detected. Black and white lattices in an area enclosed by the symbols are treated as data items in binary notation (for example, 01110010) to generate character data consisting of a character string (for example, ABCD). The character data is an identifier such as a product name, a product code, or a Uniform Resource Locator (URL). The decoder 5 feeds the character data "ABCD" to the execution processing identifying module 20. The processing to decode the 2D bar code varies depending on the actual specifications such as QR codes or CP codes.

The identifying module 20 handles the character data "ABCD" from the decoder 5 and the shooting direction data "$\theta=45°$, $\phi=90°$" from the analyzer 4 as identification data items to refer to the table stored in the storage section 21 (step S4). The table includes execution processing for each of the character data and the shooting direction data with a correspondence established therebetween. If processing associated with "ABCD" and "$\theta 45°$, $\phi=90°$" is, for example, "alarm setting" in the table, the identifying module 20 identifies processing of "alarm setting" as the execution processing (step S5). The identifying module 20 controls respective sections associated with "alarm setting" to conduct the operation for the alarm setting processing. In the operation, a notification of "alarm setting" and the sounding of the alarm are carried out by the display section and the sounding section of the data output section 22.

In the embodiment, the shooting direction data is employed as the state data. However, the present invention is not restricted by the embodiment. For example, the camera 3 may include a function in which the distance between the camera and the 2D bar code is measured and recorded during the bar code shooting operation to thereby obtain distance data and a function to send the distance data to the execution processing identifying section 20. The distance data is adopted as the state data in this situation. Or, there may be disposed an acceleration sensor including a function in which the rotary angle or inclination of the portable terminal 1 is measured to be recorded during the shooting operation to thereby attain inclination data and a function to deliver the inclination data to the identifying section 20 so that the inclination data is utilized as the state data. It is also possible to utilize a method or a unit to measure and to record the quantity of environmental light during the bar code shooting (e.g., a method or a photometer to obtain the quantity of peripheral or environmental light on the basis of the quantity of shooting light of the camera), a method or a unit to measure and to record the color temperature (e.g., a method or a color temperature sensor to obtain a color temperature according to three primary colors of the camera), and method or a unit to measure and to record the environmental or peripheral temperature (e.g., a thermometer, thermography, or an infrared ray camera). In this situation, the data of quantity of peripheral light, the color temperature data, and the data of peripheral temperature are obtained to be adopted as the state data items. The state data may be of any kind so long as the data numerically represents the state of the portable terminal or the state of the periphery or environment thereof in the bar code shooting. Although only the shooting direction data is adopted as the state data in the embodiment, the state data items described above may be appropriately combined with each other. Using the plural state data items makes it possible to further increase the amount of available information items.

According to the first embodiment, the correction information which is attained during the 2D bar code reading and is meaningless in the conventional art is efficiently used as identification data to identify processing to be executed. That is, the information can be effectively used as meaningful information. As a result, when compared with the conventional information reading apparatus, a larger amount of information items can be handled without adding hardware to the information reader.

Second Embodiment

Description will now be given of a portable terminal as an information reader according to a second embodiment of the present invention. The second embodiment is almost the same in structure as the first embodiment (FIG. 1), and the respective constituent components are substantially equal in functions thereof.

Figure 5:
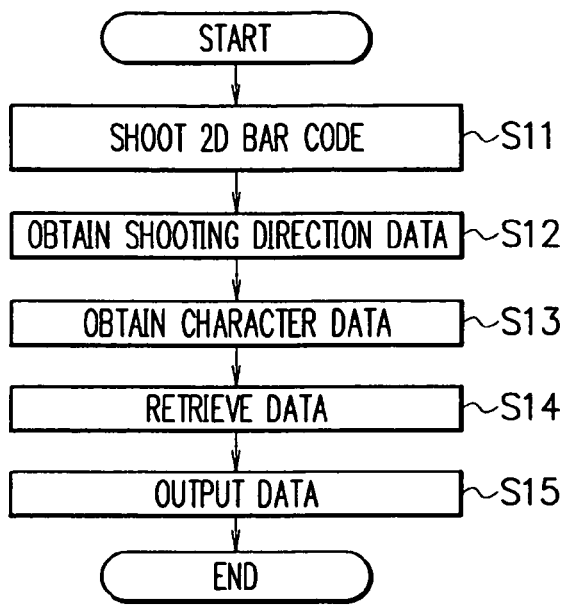
FIG. 5 is a flowchart showing operation of a portable terminal according to a second embodiment of the present invention.

The second embodiment conducts, in addition to the operation of the first embodiment, operation in which when processing to be executed by the execution processing identifying section 20 is beforehand determined, the state data (and the character data) attained using the 2D bar code is employed as identification data (retrieval key) to identify predetermined data. Referring now to FIG. 5, description will be given of the operation (associated with an information reading method and an information reading program) of the portable terminal 1 according to the second embodiment. The terminal 1 carries out operation under control of the information reading program as follows.

Processing of the identifying module 20 is assumed to be beforehand determined, i.e., data retrieval processing in the second embodiment. When the user of the terminal 1 shoots an image of a 2D bar code by a camera 3, the image of the bar code is delivered as image data to the image information analyzing module 4 (step S11). The analyzing module 4 analyzes the image data to attain a positional relationship between the bar code and the camera 3 during the shooting (i.e., a direction in which the camera 3 shoots the bar code) and then the positional relationship is fed as shooting direction data, e.g., $\theta=45°$ and $\phi=90°$ ($\theta$ and $\phi$ are angles defined in FIG. 4) to the execution processing identifying module 20 (step S12). Also, the analyzer 4 sends the image data to the 2D bar code decoder 5.

The decoder 5 receives the image data from the analyzer 4 to acquire therefrom character data (i.e. object data; step S13). The character data is obtained in almost the same way as the first embodiment. In the second embodiment, the attained character data is assumed as "EFGH". The decoder 5 passes "EFGH" to the identifying module 20. The decoding of the 2D bar code varies among actual specifications such as QR and CP codes.

The identifying module 20 treats the character data "EFGH" from the decoding module 5 and the shooting direction data "$\theta=45°$, $\phi=90°$" from the analyzer 4 as identification data items to refer to the table beforehand stored in the storage section 21 to retrieve associated data (step S14). The table contains data corresponding to the character data and the shooting direction data with a correspondence set therebetween. If an entry of the table associated with "EFGH" and "$\theta=45°$, $\phi=90°$" is, for example, a "dog picture", the identifying module 20 identifies the "dog picture" as retrieval target data and delivers the "dog picture" to the data output module 22 to display the "dog picture" thereon (step S15).

In the embodiment, image data is employed as an example of the data identified using the state data as a retrieval key. However, the present invention is not restricted by the embodiment. There may also be used voice and sound data, text data (including a HyperText Markup Language (HTML) file), key data for closing and opening of, e.g., a door, and numeric data of service points and electronic money provided by a store.

Also in the second embodiment, as in the first embodiment, various state data items can be employed, in addition to the shooting direction data, as the identification data.

Although the data retrieval processing is used as the execution processing beforehand determined, there may be used, for example, new data creation processing. In this situation, the execution processing identifying section 20 (or a data creation module additionally disposed in the system) creates new data using at least either one of the object data and the state data, or only one of the state data items (not including the object data items) to deliver the new data via the data output module 22 to an associated module.

In the second embodiment described above, the correction information which is obtained when the 2D bar code is read by the information reader and which is meaningless in the conventional techniques can be adopted as identification data to identify predetermined data. This makes it possible to effectively utilize the correction information as meaningful information. Consequently, when compared with the information reading apparatus of the conventional art, the information to be handled can be increased in quantity without adding new hardware to the information reader.

Third Embodiment

Figure 6:
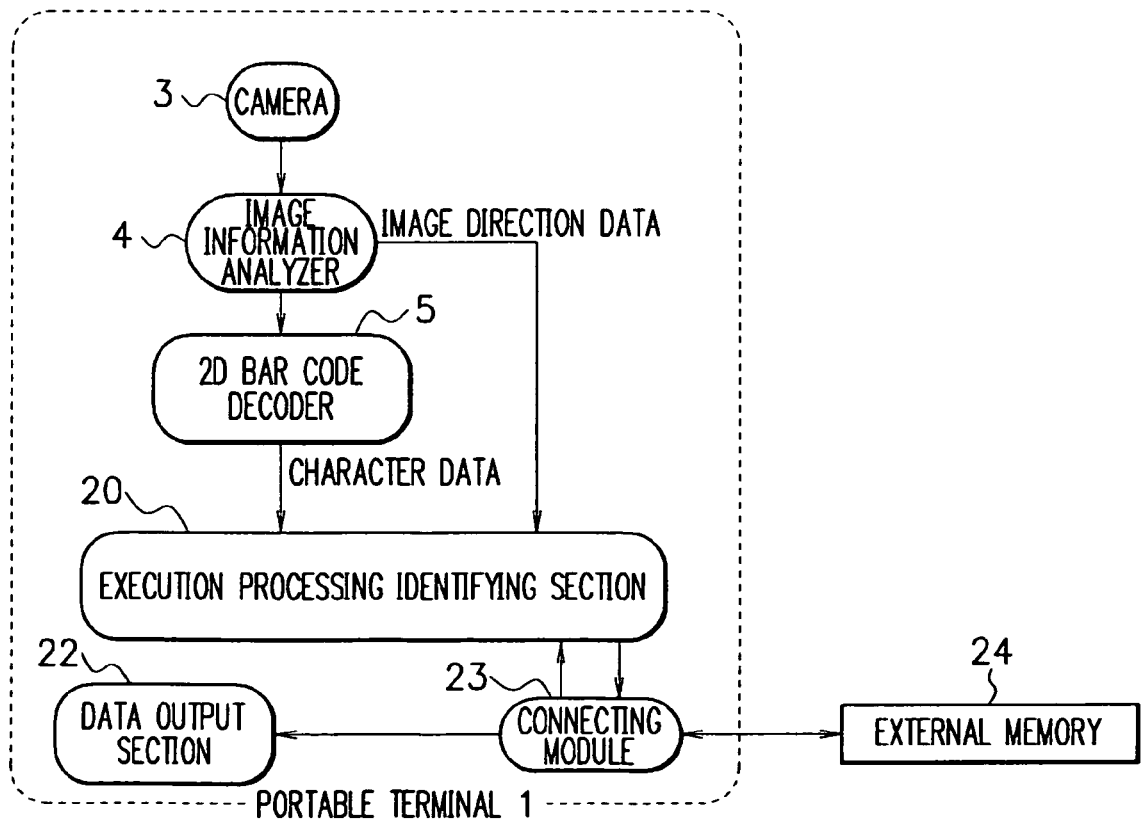
FIG. 6 is a schematic block diagram showing a configuration of the portable terminal according to a third embodiment of the present invention.

Description will now be given of a third embodiment of a portable terminal as an information reading apparatus in accordance with the present invention. FIG. 6 shows a structure of the portable terminal according to the third embodiment. When compared with the first and second embodiments (FIG. 1), the portable terminal of the third embodiment includes a connecting module 23 in place of the storage section 21 such that communication is carried out via the connecting section 23 with an external memory 24. The other constituent elements of the third embodiment are substantially equal to those of the first and second embodiments.

The connecting section 23 includes an interface function to connect to the external memory 24 and to communicate data with the execution processing identifying module 20 and the data output module 22.

The external memory 24 is a memory attachable to and detachable from the portable terminal 1. The memory 24 includes a table in which predetermined execution processing or predetermined data is associated with each of the character data and the shooting direction data. The external memory 24 may include, for example, a Universal Serial Bus (USB) memory, a USB hard disk, an Secure Digital (SD) card, and a Compact Flash card.

The third embodiment operates in almost the same way as for the first and second embodiments (FIGS. 2 and 5). That is, the identifying module 20 receives the shooting direction data from the analyzer 4 and the character data from the decoder 5. Using the received data items as the identification data, the module 20 refers to the table in the external memory 24 connected via the connecting module 23 to the portable terminal 1 to thereby identify execution processing or retrieval data.

Although the storage section 21 of FIG. 1 is dispensed with in the third embodiment, it is also possible to adopt a configuration implemented by adding the storage section 21 (functionally equal to that of the first and second embodiments) to the structure shown in FIG. 6. In the configuration, either one of the external memory 24 and the storage section 21 may be arbitrarily used. For example, to identify execution processing as above, either one of the external memory 24 and the storage section 21 may be arbitrarily referred to. Or, the user may select either one of the external memory 24 and the storage section 21 such that the identifying module 20 refers to the selected module 24 or 21. When data retrieval processing is beforehand determined as above, the identifying section 20 may use the state data as the identification data to select the external memory 24 or the storage section 21.

As described above, according to the third embodiment, the correction information which is obtained during the reading operation of the 2D bar code by the information reader and which is meaningless in the conventional art can be employed as identification data to refer to the table in the external memory to resultantly identify predetermined processing or predetermined data. It is therefore possible to effectively use the correction information as meaningful information. When compared with the conventional information reading apparatus, the amount of available information items can be increased without adding any hardware to the information reader.

Fourth Embodiment

Referring to the drawings, description will be given in detail of a fourth embodiment in accordance with the present invention.

First, description will be given of configurations of an information communicating system, a portable terminal, and a Web server according to the fourth embodiment. As can be seen from FIG. 7, the information communication system of the embodiment includes a portable terminal 1 as an information reader and a Web server 2 which is an information processing apparatus communicable via a network with the portable terminal 1.

Figure 7:
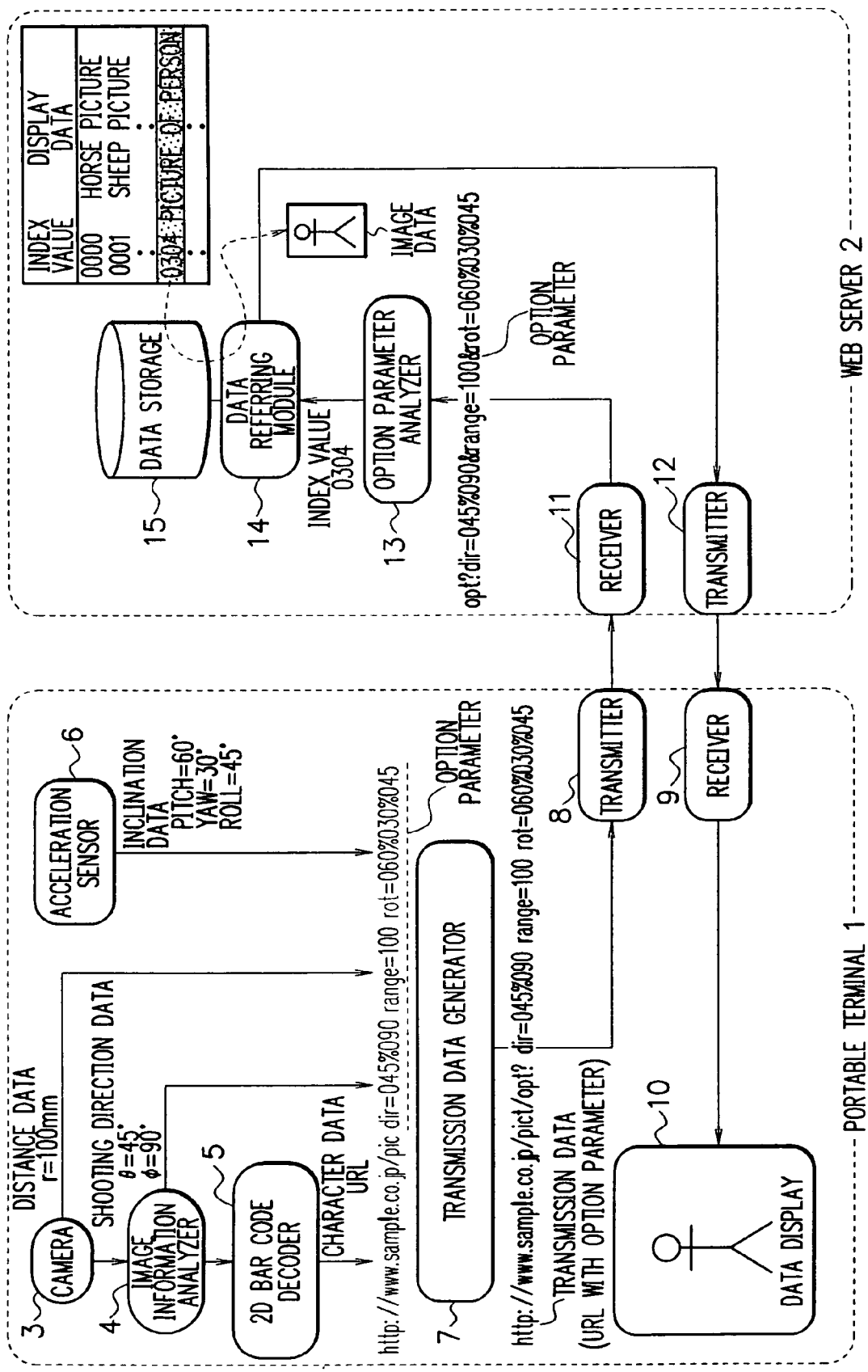
FIG. 7 is a block diagram showing structure of an information communication system, a portable terminal, and a Web server according to a fourth embodiment of the present invention.

In the fourth embodiment, the portable terminal 1 is an information reader including a function to capture an image from an object including predetermined information to extract the predetermined information from the image. The terminal 1 also has a function to communicate via a network with the Web server 2. As shown in FIG. 7, the portable terminal 1 includes a camera 3, an image information analyzer 4, a 2D bar code decoding module 5, an acceleration sensor 6, a transmission data generating module 7, a transmitting section 8, a receiving section 9, and a data display section 10.

The camera 3 has a function to shoot an image of a 2D bar code as an object to obtain image data and a function to measure and store distance (an example of state data) between the camera 3 and the 2D bar code during the bar code shooting to thereby acquire distance data. The camera 3 further has a function to deliver the image data to the image information analyzer 4 and to feed the distance data to the transmission data generator 7.

The acceleration sensor 6 includes a function to measure and store a rotary angle or inclination (an example of state data) of the portable terminal 1 during the 2D bar code shooting operation to obtain inclination data and a function to transmit the inclination data to the transmission data generator 7.

The image information analyzer 4 analyzes the image data of the bar code obtained by the camera 3 and determines and records data (an example of state data) indicating a direction in which the camera 3 shoots the 2D bar code) to thereby acquire shooting direction data. Also, the analyzer 4 includes a function to send the shooting direction data to the transmission data generator 7 and the image data to the 2D bar code decoder 5.

The decoder 5 includes a function to analyze the image data of the bar code shot by the camera 3 to attain character data (a URL of the transmission destination in this embodiment) that is contained in the 2D bar code. The decoder 5 further has a function to send the character code to the transmission data generator 7.

The generator 7 includes a function to receive the focal distance data obtained by the camera 3, the inclination data attained by the acceleration sensor 6, the shooting direction data obtained by the analyzer 4, and the character data produced by the decoder 5 to create character data by combining the data items according to a predetermined algorithm. The transmission data created in the fourth embodiment is obtained by adding, as option parameter, the data items including the focal distance data, the inclination data, and the shooting direction data to the URL (character data). The resultant data is adopted as identification data to identify a predetermined data item in the plural data items stored in a database or the like. In this embodiment, the option parameter indicates a URL parameter. The URL is defined as "scheme:// host name/(directory name)/file name?URL parameter". Part of the URL is used only to identify a destination of information transmission (a location of the Web server 2 in a network).

Although three data items, i.e., the focal distance data, the inclination data, and the shooting direction data are added as the option parameters to the character data in this embodiment, it is also possible to add at least one of the data items to the character data. The kinds of state data items are not restricted by three kinds of data. That is, arbitrary kinds of state data may be adopted only if the data numerically represents the state of the portable terminal or the surrounding conditions during the bar code shooting operation. For example, as described in conjunction with the first embodiment, it is also possible to arrange a method or a unit to measure and store, during the object shooting operation, the quantity of peripheral light, the color temperature, the peripheral temperature, and the like to obtain data of peripheral light quantity, color temperature data, and peripheral temperature data to employ the obtained data items as the option parameter.

In the embodiment, a URL is adopted as the character data. However, it is also possible to beforehand store an address (including a URL) of the information processing unit, which is a transmission target, to designate a character string (e.g., a product code) other than the URL as the character data to thereby treat the character data itself as an option parameter.

The transmitter module 8 and the receiver module 9 are communicating units including an interface function to communicate data with an external device (the Web server 2 in this embodiment).

The data display 10 is a data output module having a function to present data received from external devices to the user of the portable terminal 1.

The Web server 2 is an information processor such as a workstation server and includes an option parameter analyzing module 13, a data referring module 14, a data storage section 15, a receiving section 11, and a transmitting section 12 as shown in FIG. 7. In this embodiment, the Web server 2 capable of conducting radio communication via a network with the portable terminal 1 (information reader) is employed as an external device, but a mail server or a database server may be used as the external device. Moreover, there may also be adopted as an external device an information processing module to conduct wired communication through a predetermined cable with the information reader or an information processing unit including an interface directly connectible to the information reader. The communication protocol is not limited to Hyper-Text Transfer Protocol (HTTP), but Simple Mail Transfer Protocol (SMTP), POP, LDAP, and other particular protocols may be used. For the communication path (bearer), it is possible to employ, for example, the public communication line (telephone line), a Local Area Network (LAN), IrDA, and a short-distance radio communication line (NFC, Bluetooth, and UWB).

The data storage section 15 includes a table in which a plurality of display data items (image data items in this embodiment) is related to a plurality of index values as identifiers of the respective display data items with a correspondence established therebetween.

The option parameter analyzer 13 has a function to decode the option parameter extracted from the transmission data from the portable terminal 1 according to a predetermined algorithm to thereby extract an index value for the retrieval of display data from the data storage section 15. The analyzer 13 also includes a function to send the index value to the data referring module 14.

The module 14 has a function to receive the index value produced by the analyzer 13 to thereby acquire display data related to the index value from the data storage section 15.

The transmitter module 12 and the receiver module 11 each include an interface function to communicate with an external device (the portable terminal 1 in this embodiment).

Description has been given of the configuration of the fourth embodiment. However, depending on whether the information analyzer 4, the decoder 5, and the parameter analyzer 13 are installed in the portable terminal 1 or the Web server 2, the configuration of the embodiment may also be changed.

Figure 8:
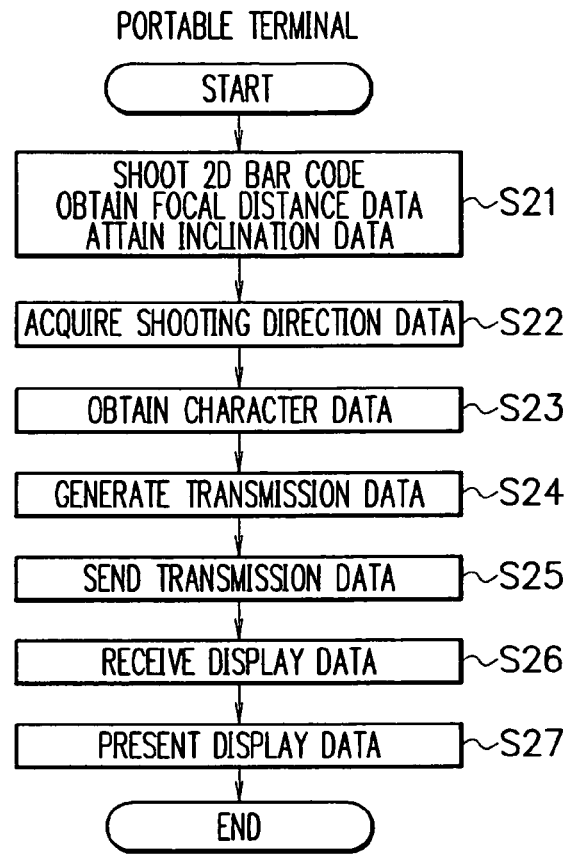
FIG. 8 is a flowchart showing operation of the portable terminal according to the fourth embodiment.
Figure 9:
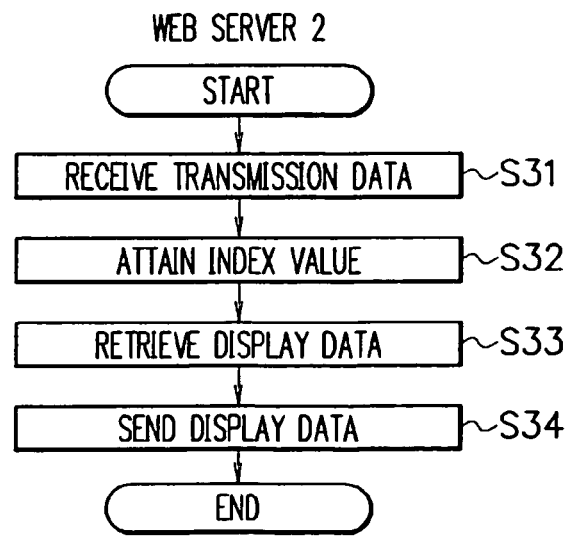
FIG. 9 is a flowchart showing operation of the Web server according to the fourth embodiment.

Referring next to FIGS. 8 and 9, description will be given in detail of operation of the fourth embodiment (an information reading method and an information reading program). In the embodiment, the portable terminal 1 and the Web server 2 carry out operations under control of the information reading program as below.

When the user of the terminal 1 shoots a 2D bar code by the camera 3, the camera 3 measures the distance between the camera 3 and the bar code during the shooting operation and then sends the measured result as distance data (r=100 millimeters (mm)) to the transmission data generator 7. The acceleration sensor 6 measures inclination of the terminal 1 during the shooting operation and transmits the result of measurement as inclination data (pitch=60°, yaw=30°, roll=45°) to the generator 7 (step S21 of FIG. 8).

Referring now to FIG. 10, description will be given of the rotary angle or inclination of the portable terminal 1 measured by the acceleration sensor 6.

The sensor 6 senses the gravitational acceleration to determine the direction toward the center of the earth in any situation. The inclination data is obtained on the basis of the pitch and the roll defined in FIG. 10. Data of "yaw" is detected and obtained by a terrestrial magnetism sensor.

The image of the 2D bar code captured by the camera 3 is delivered as image data to the image information analyzer 4. The section 4 analyzes the image data to obtain a positional relationship between the bar code and the camera 3 (the direction in which the camera 3 shoots the bar code) during the shooting operation (in almost the same way as the first embodiment). The analyzer 4 feeds the result of measurement as shooting direction data "$\theta$=45°, $\phi$=90°" to the transmission data generator 7 (step S22 of FIG. 8). The analyzer 4 also sends the image data to the 2D bar code decoder 5.

The decoder 5 analyzes the image data from the image information analyzer 4 to obtain an URL (http://www/sample.co.jp/pic) as character data (step S23 of FIG. 8).

The generator 7 combines the character data (http://www/sample.co.jp/pic) from the decoder 5, the shooting direction data ($\theta$=45°, $\phi$=90°) from the analyzer 4, the focal distance data (r=100 mm) from the camera 3, and the inclination data (pitch=60°, yaw=30°, roll=45°) from the acceleration sensor 6 into transmission data, i.e., a URL with an option parameter (opt?dir=045%090&range=100&rot=060%030%045) added thereto (step S24 of FIG. 8).

The transmitter module 8 sends the transmission data, i.e., the URL (http://www/sample.co.jp/pic/opt?dir=045%090&range=100&rot=060%030%045) including the option parameter to the Web server 2 indicated by the URL (step S25 of FIG. 8).

On receiving by the receiver module 11 the URL with the option parameter from the terminal 1, the Web server 2 notifies the option parameter analyzer 13 with the option parameter (step S31 of FIG. 9).

The analyzer 13 analyzes and decodes the option parameter to obtain an index value ("0304" in this embodiment) as an identifier of display data and feeds "0304" to the data referring module 14 (step S33 of FIG. 9).

To acquire the index value, there may be conducted operation to extract an index value by use of a table beforehand stored in, for example, a database of the Web server 2. Assume, for example, that the table shown in FIG. 11 is used and only the shooting direction data is employed as an example. Then, since the shooting direction data is "$\theta$=45°, $\phi$=90°", the index value of $\theta$ is "03" (FIG. 11A) and that of $\phi$ is "04" (FIG. 11B). Therefore, the index value is finally obtained as "0304". In the description, only the shooting direction data is treated for easy understanding of explanation. However, it is also possible to attain the index value by combining the inclination data and the distance data.

There may also be considered an example of index value acquisition in which an option parameter is analyzed or decoded to acquire state data. By assigning the value of the state data as an input value to a predetermined function, an index value can be calculated. For example, when the state data is used for a lottery, it is also possible to assign the state data to a hash function to resultantly attain a Message Digest value.

The data referring module 14 attains from the data storage section 15 display data "picture of person" (image data) related to the index value "0304" and transmits the image data to the transmitter module 12 (step S33 of FIG. 9).

The transmitter 12 sends the image data to the portable terminal 1 (step S34 of FIG. 9).

The terminal 1 receives by the receiver module 9 the image data from the transmitter 12 (step S26 of FIG. 8) and displays the image on the data display 10 (step S27 of FIG. 8).

In the description of the fourth embodiment, the data retrieval is carried out in almost the same way as the second embodiment. However, the execution processing may also be identified as described in conjunction with the first embodiment. In the processing, the table in the data storage section 15 shown in FIG. 7 is a table including an index value and predetermined processing with a correspondence therebetween. The option parameter analyzer 13 and the data referring module 14 carry out the operation in the same way as the execution processing identifier module 20 of the first embodiment. After the execution processing is determined, data indicating the processing is delivered to the portable terminal 1. The terminal 1 then executes the processing indicated by the data.

In the fourth embodiment, an index value is adopted as the identifier. However, as in the first embodiment, it is not necessarily required to use the index value. That is, the state data (and character data) analyzed by the option parameter analyzer 13 is directly adopted as a retrieval key to identify data (or execution processing) in the data storage section 15. In this situation, the table in the data storage section 15 shown in FIG. 7 is a table including state data (and character data) and predetermined data (or predetermined processing) with a correspondence therebetween. The index value is not required also in a case in which, for example, the option parameter analyzer (or another data generating module) conducts a calculation using the value of the state data (and character data) to generate new data.

In the fourth embodiment, a plurality of state data items are combined with each other into an option parameter to be added to the URL. However, there may also be conducted processing in which the state data items are treated as distinct option parameters and are added to the URL to generate respective transmission data items to be sent to the Web server. In this operation, a temporary storage section is disposed in at least either one of the portable terminal and the Web server to temporarily store transmission data items therein. Or, a function to temporarily store data may be arranged in the transmission data generator 7 and the option parameter analyzer 13 in the configuration of FIG. 7. A specific example will be described in conjunction with a fifth embodiment.

According to the fourth embodiment described above, the correction information which was obtained when the 2D bar code was read by the information reader and was not significant in the conventional techniques can be utilized as identification data to communicate with an Web server to thereby identify predetermined data. This makes it possible to effectively use the correction information as meaningful information. Therefore, as compared with the information reading apparatus of the conventional art, the information to be handled can be increased in quantity without adding any hardware to the information reader.

Fifth Embodiment

Referring now to FIGS. 12A to 12C and FIG. 13, description will be given in detail of a fifth embodiment in accordance with the present invention. The embodiment includes a portable terminal substantially equal in the configuration and the function to one of the portable terminal of the first to fourth embodiments.

In the fifth embodiment, when the camera is activated to a shooting mode, the portable terminal 1 displays a guide mark (guide mark on an information reader side; an example of a state data confirming scheme) 19 to appropriately adjust a relative angle with respect to a 2D bar code as an object, in a finder as a display module 16 as shown in FIG. 12A. On the other hand, as can be seen from FIG. 12B, an arrow-shaped guide mark (guide mark on an object side; an example of a state data confirming mechanism) 25 is printed or embossed over the QR code as a 2D bar code. When it is desired to shoot the QR code of FIG. 12B at an angle of 45°, the user aligns "45" of the guide mark 19 in the finder with the arrow mark of the guide mark 25 of the QR code as shown in FIG. 12C.

By using the guide marks 19 and 25, the user of the portable terminal 1 can easily and simply confirm the inclination of the terminal 1 when shooting an object by the camera. In this connection, the guide mark 25 of FIG. 12B is not necessarily required for the QR code. That is, the shooting angle can be confirmed by aligning the guide mark 19 on the portable terminal side with arbitrary one of the three cut-off symbols.

There may also be arranged a state data confirming scheme to confirm state data other than the shooting angle during the shooting operation. By presenting, for example, values of shooting distance, a shooting direction, and a peripheral condition such as temperature and brightness on the display section according to the position of the portable terminal 1, it is possible for the user side to confirm the state data items during the shooting operation.

By repeatedly reading the 2D bar code several times using the guide marks 19 and 25, a plurality of state data items can be obtained for subsequent processing. Description will be given of an example of operation in which a dial lock key is closed and is opened in the information reading system according to the fourth embodiment. The portable terminal 1 or the Web server 2 includes a temporary storage section to temporarily store a plurality of state data items. The data storage section 15 includes a table shown in FIG. 13. Each entry of the table includes an index value for each reading operation, display data to be presented on the portable terminal 1, and an action (processing) to be conducted in the portable terminal 1 with a correspondence established therebetween as shown in FIG. 13.

When the temporary storage section is disposed in, for example, the Web server 2, each time transmission data is received from the terminal 1, the data is stored in the temporary storage section. The option parameter analyzer 13 analyzes the option parameter of each transmission data in the temporary storage section to acquire an index value. The data referring module 14 refers, by use of the index value, the table in the data storage section 15 to identify display data and an action. It is assumed in FIG. 13 that authentication is successfully conducted if the first, second, and third index values are "0100", "0002", and "0404", respectively. When the successful authentication is recognized, the data referring module 14 sends an image indicating "successful authentication" and "key-opening data", which is used to open the key, via the transmitter section 12 to the portable terminal 1. The terminal 1 then displays the image of "successful authentication" to the data display 10 and executes processing to open the dial lock key. If one of the first to third index values is other than the predetermined index value, the data referring section 14 assumes that the authentication has failed and transmits an image indicating the failed authentication to the terminal 1.

In the repeated reading operations of the 2D bar code, there may be employed either one of a still picture and a moving picture.

According to the fifth embodiment described above, the information reader or the object of the reading operation includes a function to confirm state data, and hence users can easily confirm the state data through a simple operation. By reading the 2D bar code multiple times, a plurality of state data items can be obtained for subsequent processing. This advantageously increases the quantity of information to be handled.

Sixth Embodiment

In a sixth embodiment of the present invention, the portable terminal 1 of one of the first to fifth embodiments further includes a state data change module to change state data to a desired value on the user side. By arranging, for example, a mechanism to rotate only the section of the camera 3, the user can easily change the shooting direction of the camera 3. Or, for example, a color filter to change a hue during the shooting operation may be disposed in the camera 3 so that the user simply changes the hue to shoot an object. It is also possible to change the quantity of shooting light by emitting light using a flash lamp or by turning a lamp on during the shooting operation.

Additionally, there may be arranged on the object side a state data change module to alter state data to a desired value on the user side. For example, a universal joint may be disposed on a rear surface of a fixing section of the 2D bar code to freely rotate the bar code. This enables the user to easily change the angle of the 2D bar code.

According to the sixth embodiment, by disposing a module to arbitrarily change state data in the information reader or the object, the state data can be simply varied on the user side.

Seventh Embodiment

Referring now to FIGS. 14A to 14C, description will be given of a seventh embodiment in accordance with the present invention. The embodiment is implemented on the basis of the configuration of the fourth embodiment. In the seventh embodiment, the object data of the 2D bar code as the shooting object includes either one of (1) state data designation information indicating a URL parameter which can be interpreted on the side of the Web server 2 and (2) state data designation information indicating a physical size of the 2D bar code.

First, the information of (1) will be described. For example, an option parameter including at least one empty field is arranged in the object data as shown in FIG. 14A. Each empty field is filled with a value of predetermined state data. When the bar code including the object data is shot by the portable terminal 1, the transmission data generator 7 of the terminal 1 recognizes each of the empty fields to create transmission data by filling the field with predetermined state data. If the bar code is shot by a portable terminal not including a module to obtain state data, the transmission data including the empty fields is sent to the Web server 2 without filling the empty fields with any data. The option parameter analyzer 13 of the Web serve 2 recognizes that the option parameter of the transmission data includes empty fields and hence assumes that the portable terminal is unable to acquire state data. The analyzer 13 sends to the portable terminal a reply message indicating that predetermined state data is to be acquired or that the portable terminal is not an appropriate terminal.

As described above, by disposing the information of (1), when the portable terminal is able to obtain a plurality of state data items, there can be acquired the state data required as the option parameter. Therefore, a new function can be added to the portable terminal while retaining compatibility with the conventional portable terminals.

Next, description will be given of the information of (2). As can be seen from FIG. 14B, the object data includes an option parameter including information representing a print size of the 2D bar code. Naturally, the object data may include information other than that of the print size. In FIG. 14B, "030" designates that the print size of the bar code is "30 mm". When the bar code is shot, the image information analyzer 4 calculates the distance between the bar code and the portable terminal 1 according to "030" and image data. The result of calculation, i.e., 120 mm in this embodiment, is adopted as an option parameter in the transmission data generator 7 to be placed at a predetermined position of the transmission data as shown in FIG. 14C. Although the image information analyzer 4 calculates the distance in the embodiment, there may be separately arranged a distance calculation module having a function similar to that of the analyzer 4.

By use of the information of (2), it is possible to calculate the state data required as the option parameter. Therefore, a new function can be added to the portable terminal while retaining compatibility with the associated potable terminals of the conventional art.

Description has been given of the first to seventh embodiments in accordance with the present invention. However, the present invention is not restricted by the embodiments. The embodiments can be modified in various ways within the scope of the present invention. It is also possible to implement embodiments by combining the configuration examples, the function examples, and the processing operation examples with each other in various fashions. The operations of processing in the portable terminal 1 and the Web server 2 of the embodiments are carried out under control of the information reading program.

It is to be appreciated that the present invention is applicable generally to terminal modules including an information reading section, for example, a camera, a scanner, or a bar code reader.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An information reader, comprising:
  object reading unit for reading an image of an object and obtaining the image as image data;
  object data obtaining unit for analyzing the image data and obtaining object data as data contained in the object itself;
  reading state data obtaining unit for obtaining reading state data indicating a reading state of the object reading unit during an object image reading operation to read an image of the object;
  identifying unit for identifying predetermined processing using as identification data the reading state data and the object data; and
  at least one of a state data confirming unit enabling a user of the information reader to confirm a value of state data obtained during the object image reading operation, and a state data changing unit enabling the user of the information reader to arbitrarily change the value of state data obtained during the object image reading operation.

2. The information reader in accordance with claim 1, further comprising storage unit for storing therein at least one of the state data and the object data and the predetermined processing with a corresponding established therebetween, the identifying unit identifying the predetermined processing by referring to the storage unit.

3. The information reader in accordance with claim 1, further comprising connecting unit for connecting to an external storing medium storing therein at least one of the state data and the object data and the predetermined processing with a corresponding established therebetween, the identifying unit identifying the predetermined processing by referring to the external storing medium.

4. The information reader in accordance with claim 1, further comprising communicating unit for conducting communication with an external information processing apparatus, wherein the reader transmits at least one of the state data and the object data via the communicating unit to the information processing apparatus.

5. The information reader in accordance with claim 1, wherein the identifying unit identifies predetermined data by using as identification data at least one of the state data and the object data.

6. The information reader in accordance with claim 1, wherein the identifying unit creates new data according to at least one of the state data and the object data.

7. The information reader in accordance with claim 1, further comprising data output unit for outputting therefrom data identified by the identifying unit, new data created by the identifying unit, and data received from the information processing apparatus.

8. The information reader in accordance with claim 1, further comprising temporary storage unit for temporarily saving, when a plurality of state data items are obtained by the state data obtaining unit, the plural state data items therein, wherein the identifying unit uses as identification data the plural state data items saved in the temporary storage unit.

9. The information reader in accordance with claim 1, wherein the state data obtaining unit obtains as the state data at least one of data indicating a state of the information reader during the object image reading operation and data indicating a state around the object during the object image reading operation.

10. The information reader in accordance with claim 1, wherein the state data is direction data indicating a reading direction of the information reader with respect to the object.

11. The information reader in accordance with claim 1, the state data being one selected from distance data indicating distance between the object and the information reader, inclination data indicating inclination of the information reader itself during the object image reading operation, color temperature data indicating color temperature of the object during the object image reading operation, peripheral temperature data indicating peripheral temperature of the object during the object image reading operation, and peripheral light quantity data indicating a quantity of peripheral light of the object during the object image reading operation.

12. The information reader in accordance with claim 1, wherein the image of the object is a two-dimensional code.

13. An information processing apparatus for communicating with an information reader for reading an image of an object and obtaining object data as data contained in the object itself, comprising:

identifying unit for receiving reading state data obtained by the information reader, said reading state data indicating a reading state of the information reader relative to the object during object image reading operation to read the object by the information reader, and identifying predetermined processing using the state data and the object data as identification data, wherein the information reader comprises at least one of a state data confirming unit enabling a user of the information reader to confirm a value of state data obtained during the object image reading operation, and a state data changing unit enabling the user of the information reader to arbitrarily change the value of state data obtained during the object image reading operation.

14. The information processing apparatus in accordance with claim 13, further comprising storage unit for storing therein at least one of the state data and the object data and the predetermined processing with a correspondence established therebetween, wherein the identifying unit identifies the predetermined processing by referring to the storage unit.

15. The information processing apparatus in accordance with claim 13, wherein the identifying unit identifies predetermined data by using as identification data at least one of the state data and the object data.

16. The information processing apparatus in accordance with claim 13, wherein the identifying unit creates new data according to at least one of the state data and the object data.

17. The information processing apparatus in accordance with claim 13, further comprising temporary storage unit for temporarily saving the plural state data items when a plurality of state data items are received from the information reader, wherein the identifying unit uses as identification data the plural state data items saved in the temporary storage unit.

18. The information processing apparatus in accordance with claim 13, wherein the state data is at least one of data indicating a state of the information reader during the object image reading operation and data indicating a state around the object during the object image reading operation.

19. The information processing apparatus in accordance with claim 13, wherein the state data is direction data indicating a reading direction of the information reader with respect to the object.

20. The information processing apparatus in accordance with claim 13, wherein the state data is one selected from distance data indicating distance between the object and the information reader, inclination data indicating inclination of the information reader itself during the object image reading operation, color temperature data indicating color temperature of the object during the object image reading operation, peripheral temperature data indicating peripheral temperature of the object during the object image reading operation, and peripheral light quantity data indicating a quantity of peripheral light of the object during the object image reading operation.

21. The information processing apparatus in accordance with claim 13, wherein the image of the object is a two-dimensional code.

22. An information communicating system comprising:

an information reader for reading an image of an object and obtaining object data as data contained in the object itself; and an information processing apparatus for communicating with the information reader, the information communicating system using, as identification data, reading state data obtained by the information reader and which indicates a reading state of the information reader during object image reading operation to read the object by the information reader and the object data, wherein the information reader comprises at least one of a state data confirming unit enabling a user of the information reader to confirm a value of state data obtained during the object image reading operation, and a state data changing unit enabling the user of the information reader to arbitrarily change the value of state data obtained during the object image reading operation.

23. An information communicating system comprising:
an information reader; and
an information processing apparatus for communicating with the information reader,
the information reader comprising:
object reading unit for reading an image of an object and obtaining the image as image data;
object data obtaining unit for analyzing the image data and obtaining object data as data contained in the object itself;
reading state data obtaining unit for obtaining reading state data indicating a reading state of the object reading unit during object image reading operation to read an image of the object;
first communicating unit for transmitting the reading state data and the object data to the information processing apparatus; and
at least one of a state data confirming unit enabling a user of the information reader to confirm a value of state data obtained during the object image reading operation, and a state data changing unit enabling the user of the information reader to arbitrarily change the value of state data obtained during the object image reading operation,
the information processing apparatus comprising:
second communicating unit for receiving the object data and the reading state data from the information reader; and
identifying unit for identifying predetermined processing by using as identification data the reading state data and the object data.

24. The information communicating system in accordance with claim 23,
the information processing apparatus further comprising storage unit for storing therein at least one of the state data and the object data and the predetermined processing with a corresponding established therebetween,
the identifying unit identifying the predetermined processing by referring to the storage unit.

25. The information communicating system in accordance with claim 23, wherein the information processing apparatus identifies by the identifying unit predetermined data by using as identification data at least one of the state data and the object data.

26. The information communicating system in accordance with claim 23, wherein the information processing apparatus creates by the identifying unit new data according to at least one of the state data and the object data.

27. The information communicating system in accordance with claim 23, the information processing apparatus further comprising first temporary storage unit for temporarily saving the plural state data items therein when a plurality of state data items are received from the information reader,
wherein the identifying unit uses as identification data the plural state data items saved in the first temporary storage unit.

28. The information communicating system in accordance with claim 23, the information reader further comprising transmission data generating unit for combining the object data with the state data and thereby generating data to be transmitted to the information processing apparatus.

29. The information communicating system in accordance with claim 23, the information reader further comprising data output unit for outputting data received from the information processing apparatus.

30. The information communicating system in accordance with claim 23, the information reader further comprising second temporary storage unit for temporarily saving the plural state data items when a plurality of state data items are received from the data obtaining unit.

31. The information communicating system in accordance with claim 23, wherein the information reader obtains by the state data obtaining unit as the state data at least either one of data indicating a state of the information reader during object image reading operation to read the object image and data indicating a state around the object during the object image reading operation.

32. The information communicating system in accordance with claim 23, wherein the state data is direction data indicating a reading direction of the information reader with respect to the object.

33. The information communicating system in accordance with claim 23, wherein the state data is one selected from distance data indicating distance between the object and the information reader, inclination data indicating inclination of the information reader itself during the object image reading operation, color temperature data indicating color temperature of the object during the object image reading operation, peripheral temperature data indicating peripheral temperature of the object during the object image reading operation, and peripheral light quantity data indicating a quantity of peripheral light of the object during the object image reading operation.

34. The information communicating system in accordance with claim 23, wherein the image of the object is a two-dimensional code.

35. The information communicating system in accordance with claim 23, the object further comprising state data designating information to designate required state data in the state data.

36. An information reading method for use with an information reader, comprising the steps of:
reading an image of an object and obtaining the image as image data;
obtaining reading state data indicating a reading state of the information reader during object image reading operation to read an image of the object;
analyzing the image data and obtaining object data as data contained in the object itself;
identifying predetermined processing by using as identification data the reading state data in the state data and the object data; and
enabling a user of the information reader to perform at least one of confirming a value of state data obtained during the object image reading operation, and changing the value of state data obtained during the object image reading operation.

37. An information reading method for use with an information reader and an information processing apparatus communicating with the information reader, comprising the steps by the information reader of:
reading an image of an object and obtaining the image as image data;
obtaining reading state data indicating a reading state of the information reader during object image reading operation to read an image of the object;
analyzing the image data and obtaining object data as data contained in the object itself;
transmitting of the state data and the object data to the information processing apparatus; and
enabling a user of the information reader to perform at least one of confirming a value of state data obtained during the object image reading operation, and changing the value of state data obtained during the object image reading operation, the method further comprising the steps by the information processing apparatus of:

receiving the object data and the state data from the information reader; and identifying predetermined processing by using as identification data the reading state data and the object data.

38. The information reading method in accordance with claim 36 or 37, further comprising the step of identifying predetermined data in either one of the information reader or the information processing apparatus by using at least one of the state data and the object data as identification data.

39. The information reading method in accordance with claim 38, further comprising the step by either one of the information reader and the information processing apparatus of creating new data according to at least one of the state data in the state data and the object data.

40. The information reading method in accordance with claim 38, further comprising the step by either one of the information reader and the information processing apparatus of outputting the identified data and the new created data.

41. The information reading method in accordance with claim 38, further comprising the step in either one of the information reader and the information processing apparatus of temporarily saving, when a plurality of state data items are obtained by the state data obtaining step, the plural state data items.

42. The information reading method in accordance with claim 38, the state data obtaining step comprising the step of obtaining as the state data at least either one of data indicating a state of the information reader during the object image reading operation and data indicating a state around the object during the object image reading operation.

43. The information reading method in accordance with claim 38, wherein the state data is direction data indicating a reading direction of the information reader with respect to the object.

44. The information reading method in accordance with claim 38, wherein the state data is one selected from distance data indicating distance between the object and the information reader, inclination data indicating inclination of the information reader itself during the object image reading operation, color temperature data indicating color temperature of the object during the object image reading operation, peripheral temperature data indicating peripheral temperature of the object during the object image reading operation, and peripheral light quantity data indicating a quantity of peripheral light of the object during the object image reading operation.

45. The information reading method in accordance with claim 38, wherein the image of the object is a two-dimensional code.

* * * * *